United States Patent [19]

Allport

[11] 4,247,051

[45] Jan. 27, 1981

[54] IRRIGATION HOSE AND METHOD FOR ITS CONSTRUCTION

[76] Inventor: Davies Allport, 8960-C Carroll Way, San Diego, Calif. 92121

[21] Appl. No.: 105,518

[22] Filed: Dec. 20, 1979

Related U.S. Application Data

[63] Continuation-in-part of Ser. No. 887,348, Mar. 16, 1978, abandoned, which is a continuation-in-part of Ser. No. 784,064, Apr. 4, 1977, abandoned.

[51] Int. Cl.³ .............................................. B05B 15/00
[52] U.S. Cl. .................................................. 239/542
[58] Field of Search ............... 239/145, 450, 542, 547; 138/42, 43, 46, 114–116, 128; 405/36, 43, 44, 48

[56] References Cited

U.S. PATENT DOCUMENTS

| | | | |
|---|---|---|---|
| 3,361,359 | 1/1968 | Chapin | 239/145 |
| 3,736,755 | 6/1973 | Hammond et al. | 239/542 X |
| 3,870,236 | 3/1975 | Sahagun-Barragan | 239/542 |
| 3,874,598 | 4/1975 | Havens | 239/542 |
| 3,951,345 | 4/1976 | Mehoudar | 239/542 |
| 4,009,832 | 3/1977 | Tiedt | 239/542 |
| 4,047,995 | 9/1977 | Leal-Diaz | 239/542 X |
| 4,053,109 | 10/1977 | Gilead | 239/542 |

FOREIGN PATENT DOCUMENTS 2356986  6/1976  France ..................................... 239/542

*Primary Examiner*—Johnny D. Cherry
*Attorney, Agent, or Firm*—Christie, Parker & Hale

[57] ABSTRACT

An irrigation hose comprises an elongated flat sheet of flexible water impervious material bent along its length to form a lapped longitudinal seam between opposing longitudinal margins of the sheet. Two transverse ribs in spaced apart relationship interconnect the opposing margins along their length to seal the longitudinal seam, thereby forming a flow regulating tube defined by the ribs and the opposing margins and forming a supply tube defined at least in part by the remainder of the sheet. The hose has a plurality of longitudinally spaced inlets to the flow regulating tube and a plurality of longitudinally spaced outlets from the flow regulating tube displaced from the respective inlets to provide a substantial path length from each inlet to a respective outlet.

24 Claims, 12 Drawing Figures

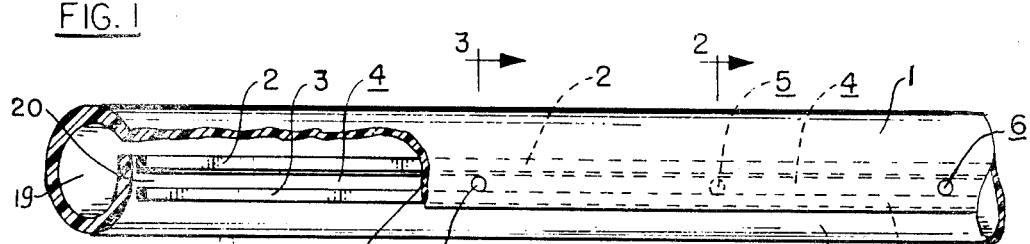
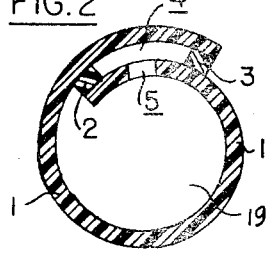
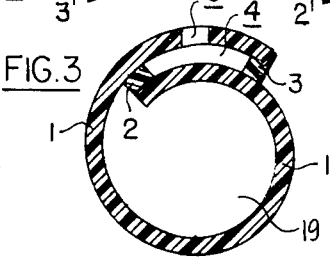
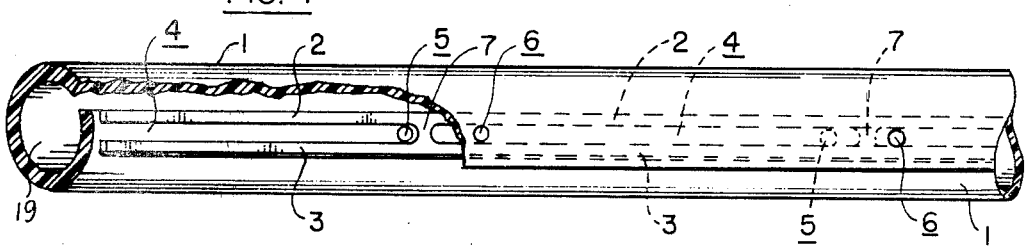
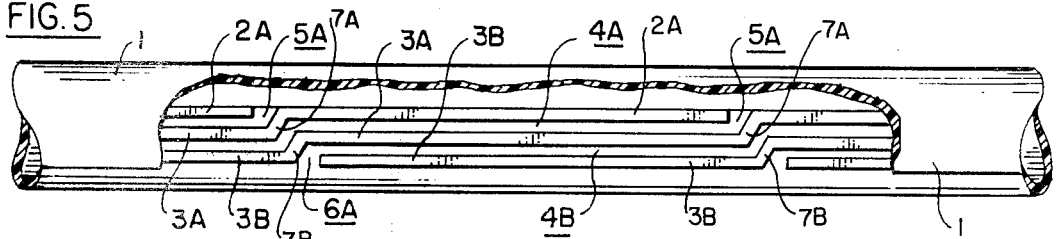
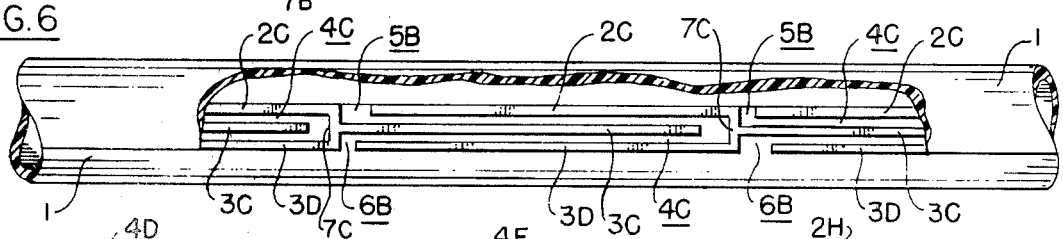
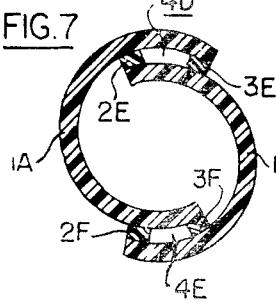
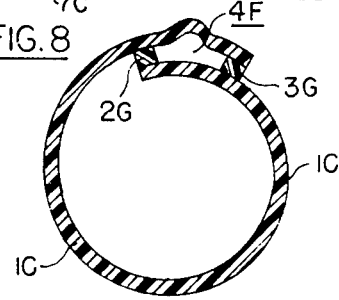
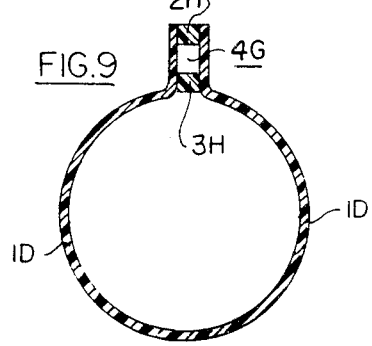

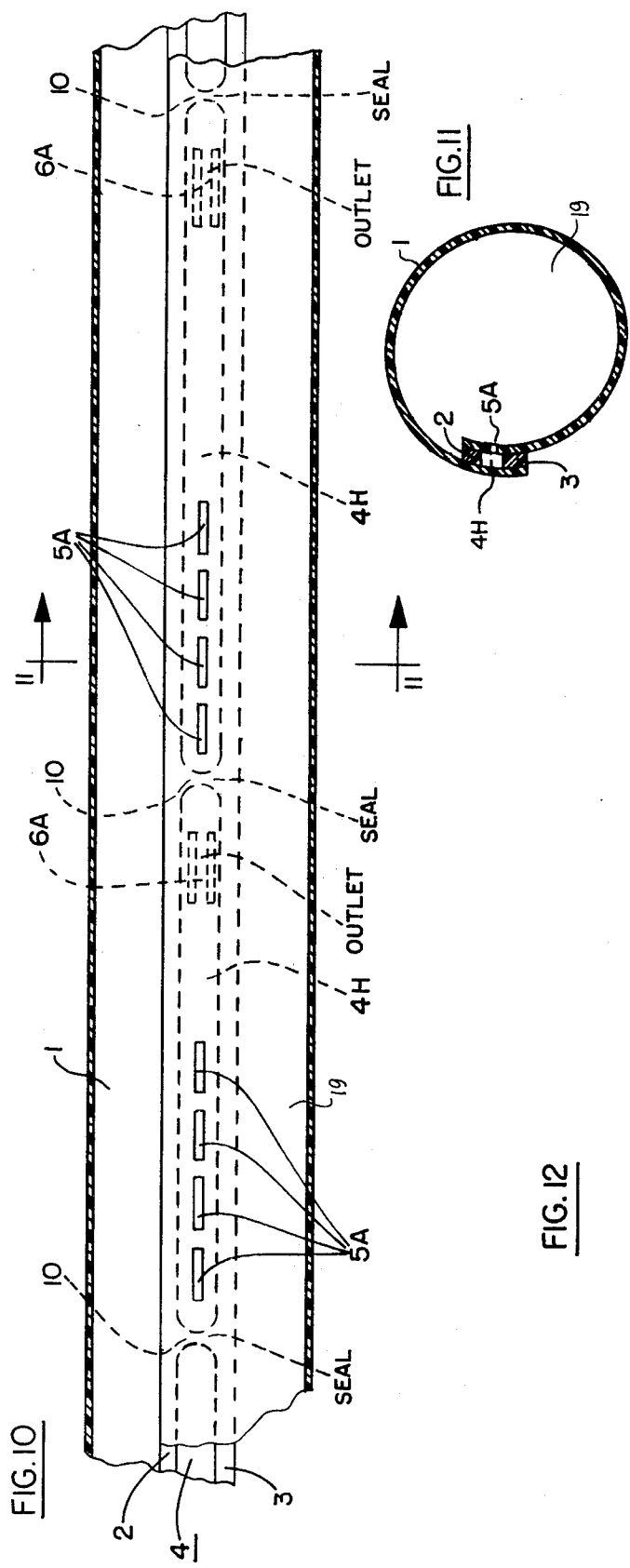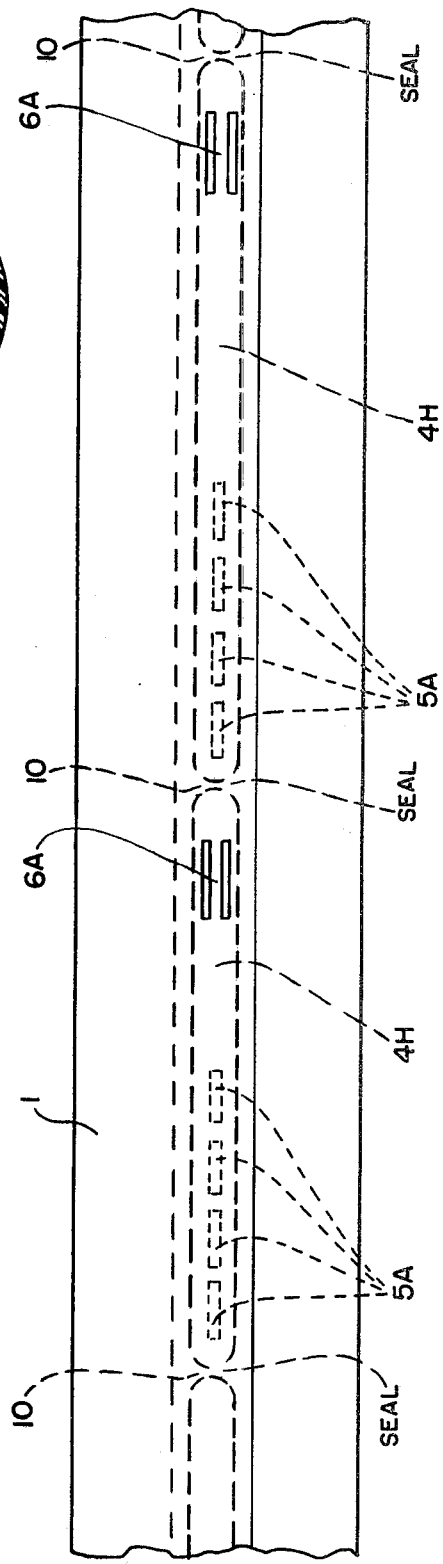

4,247,051

IRRIGATION HOSE AND METHOD FOR ITS CONSTRUCTION

CROSS-REFERENCE TO RELATED APPLICATIONS

In accordance with 35 U.S.C. 120, this application of Ser. No. 887,348, filed Mar. 26, 1978 now abandoned, which is a continuation-in-part and claims priority of application Ser. No. 784,064, filed Apr. 4, 1977, now abandoned.

BACKGROUND OF THE INVENTION

This invention relates to crop irrigation and, more particularly, to an irrigation hose and a method for its construction.

Irrigation of crops is well known and has been in use since early history. Some irrigation systems which are currently in wide use are field flooding, furrow flooding, and sprinkler systems. These prior art systems, however, tend to waste water, to wash away nutrients, to compact soil, to aid the growth of weeds, to require considerable labor to operate, and to supply water to the irrigated crops at undesirable rates.

In order to reduce the problems inherent in the prior art systems referred to above, trickle irrigation has come into widespread use. Unlike the previous systems which distribute excessive water over wide areas, trickle irrigation systems supply water at a slow controlled rate to the root zone of the particular plant being irrigated. Typically, this is accomplished by providing a small water outlet at each plant which allows a limited dripping or flowing of water directly to the root zone of the particular plant. Since evaporation, run-off, overwatering, and watering beyond the root zone is eliminated by the use of trickle irrigation systems, substantial water savings are realized. Additionally, trickle irrigation results in savings in fertilizers and chemicals which may be applied without being washed away, thereby improving the quantity and quality of the crops, and trickle irrigation also results in less salt deposit in the root zone because less water is used.

There are two major types of trickle irrigation systems in general use today. One prior art trickle irrigation system involves the use of fittings, or emitters, which are designed with long restricting passages through which water must pass to an outlet. Such emitters, however, are relatively costly, and a more general type of system used in the prior art is the continuous hose system. In one type of continuous hose system, hoses made of porous material are used and the water in the hose seeps through the hose to the zone being irrigated. Other types of prior art continuous hose systems involve the use of hoses of non-porous material, which have outlet holes spaced along their length. The outlet holes in the prior art hoses must be small in order to maintain a desired flow rate, and they tend to become clogged with silt or precipitating chemicals carried in the water. Attempts have been made in the prior art to provide continuous hose systems which are not susceptible to such clogging. The present invention is of the continuous hose type in which clogging is successfully obviated.

SUMMARY OF THE INVENTION

According to one aspect of the invention, an irrigation hose comprises an elongated flat sheet of flexible, water impervious material bent along its length to form a lapped longitudinal seam between opposing longitudinal margins of the sheet. Two transverse ribs in spaced apart relationship interconnect the opposing margins along their length to seal the longitudinal seam, thereby forming a flow regulating tube defined by the ribs and the opposing margins and forming a supply tube defined at least in part by the remainder of the sheet. The hose has a plurality of longitudinally spaced inlets to the flow regulating tube and a plurality of longitudinally spaced outlets from the flow regulating tube displaced from the respective inlets to provide a substantial path length from each inlet to a respective outlet.

The flow regulating tube in the hose of the present invention has sufficiently small cross-section so that it serves to regulate the flow of water therethrough. This means that the inlets to and the outlets from the flow regulating tube may be relatively large, since they are not used to regulate the flow of water. Therefore, the inlets and outlets may be made large enough so as not to be susceptible to clogging during the use of the hose of the invention.

A feature of the described irrigation hose is the provision of seals of the opposing margins to each other between the ribs at spaced intervals along the length of the sheet to divide the flow regulating tube into separate tube sections contiguous to the supply tube and individually connected thereto by the inlets. Preferably, one inlet is located near one end of each tube section and one outlet is located near the other end of each tube section. As a result, water is delivered to the outlets through individual flow regulating tube sections that approximate a parallel connection to the supply tube. This permits approximately uniform water distribution through the irrigation hose to all the outlets even when the hose is thousands of feet long.

According to another aspect of the invention, an irrigation hose is constructed by a method comprising the steps of bending an elongated flat sheet of flexible water impervious material along its length to form a lapped longitudinal seam between opposing longitudinal margins of the sheet, sealing the longitudinal seam with two rib-like adhesive beads extending longitudinally along the opposing margins of the sheet in spaced apart relationship to form a flow regulating tube defined by the beads and the opposing margins and to form a supply tube defined at least in part by the remainder of the sheet, forming a plurality of longitudinally spaced inlets to the flow regulating tube, and forming a plurality of longitudinally spaced outlets from the flow regulating tube.

BRIEF DESCRIPTION OF THE DRAWINGS

The features of specific embodiments of the best mode contemplated of carrying out the invention are illustrated in the drawings, in which:

FIG. 1, is a side view, partly in section, of a hose having a lapped seam sealed by two spaced and parallel beads of adhesive material, in accordance with one embodiment of the invention;

FIG. 2, is a cross-section taken along the line 2—2 of FIG. 1;

FIG. 3, is a cross-section taken along the line 3—3 of FIG. 1;

FIG. 4, is a side view, partially in section, of a hose constructed in accordance with a second embodiment of the invention;

FIG. 5, is a side view, partly in section, of a hose representing a third embodiment of the invention;

FIG. 6, is a side view, partly in section, of a hose representing a fourth embodiment of the invention;

FIG. 7, is a cross-section view of a hose formed with two flow-controlling seams, and representing another embodiment;

FIG. 8, is a cross-section view of a hose representing yet another embodiment of the invention;

FIG. 9, is a cross-section view of a hose representing a still further embodiment;

FIG. 10, is a side-sectional view showing the inner surface of a further embodiment;

FIG. 11, is a cross-section taken along the line 11—11 of FIG. 10; and

FIG. 12, is a side view of the embodiment of FIG. 10, showing the outer surface.

DETAILED DESCRIPTION OF THE SPECIFIC EMBODIMENTS

In the embodiment of FIG. 1, a hose or tube is formed from an elongated flat sheet 1 of flexible water impervious material which may, for example, be a laminate of high density polyethylene and polypropylene, and which may have a thickness sufficient to withstand the water pressure involved. Typically, sheet 1 would comprise a 2 mil inner layer of polypropylene covered by 3 mil outer layers of polyethylene, the resulting three-layer laminated sheet being 8 mils thick. Polypropylene is tough, resistive to puncture, and less palatable to ants than polyethylene. Polyethylene is easier to work and seal. By combining these materials in the described laminate, the advantageous characteristics of both materials can be utilized. Sheet 1 is bent along its length to form an overlapping longitudinal seam between an interior margin 20 and an exterior margin 21 of sheet 1. The opposing faces of the margins 20 and 21 are in juxtaposed relation to each other. Longitudinally extending transverse ribs 2 and 3 lie in spaced apart relationship and interconnect the margins 20 and 21 continuously along their length to seal the overlapping longitudinal seam, along which the ribs 2 and 3 extend in parallel relation thereto. As a result, a water flow regulating tube 4 is defined by the ribs 2 and 3 and the margins 20 and 21 and a water supply tube 19 is defined by the remainder of sheet 1 and the interior margin 20.

Ribs 2 and 3 are preferably formed by applying adhesive beads to margins 20 and 21, thereby fusing margins 20 and 21 to the beads, which comprise ribs 2 and 3. Each adhesive bead could comprise adhesive on a non-adhesive carrier, e.g., a monofilament fishing line coated with a thin layer of adhesive, in which case the sealing and rib forming functions are performed by separate elements, i.e., the layer of adhesive seals and the monofilament fishing line forms the rib; or it could comprise a bead of pure adhesive, e.g., hot melt of the same material as sheet 1 or a different material that is compatible therewith and adheres thereto, in which case the sealing and rib forming functions are performed by the same element, i.e., the hot melt seals and forms the rib. The latter form of adhesive bead is preferable.

A plurality of longitudinally spaced holes or openings 5 are formed in the interior margin 20 as inlet ports to the flow regulating tube 4. A plurality of longitudinally spaced holes or openings 6 are formed in the exterior margin 21 as outlet ports from the water regulating tube 4. The outlet ports are displaced longitudinally from the respective inlet ports so water must travel over a substantial path length through the flow regulating tube 4 from each inlet to a respective outlet.

Ribs 2 and 3 are transverse in the sense that they are formed from material in addition to the material forming flat sheet 1, rather than from deformation of such sheet forming material, i.e., the height of the transverse ribs is provided by material in addition to the material providing the thickness to the flat sheet and they extend transversely, preferably normally, from the opposing faces of the margins 20 and 21. Such transverse ribs, which are of discrete and uniform height, serve to keep the flow regulating tube 4 open as the interior margin 20 tends to expand outwardly due to the pressure difference between the supply tube 19 and the flow regulating tube 4.

Water flowing through the supply tube 19 of the hose also flows through the inlet holes 5 into the flow regulating tube 4, which serves as a secondary water distribution passage. The restricted cross-section of the regulating tube and the distance of travel therethrough regulate the flow of water in the regulating tube, and, thereby regulate the flow of water through the outlet holes 6. Thus, the inlet and outlet holes themselves may have sufficiently large diameters so as not to be susceptible to clogging. Moreover, the flow within the regulating tube 4 is of sufficient velocity when operating under normal conditions to provide self-cleaning for the inlet and outlet holes.

Ribs 2 and 3 must have sufficient height to keep the interior and exterior margins 20 and 21 of the lapped seam defining the regulating tube 4 separated; otherwise water would be prevented from flowing from the inlet holes 5 to the outlet holes 6. The hose can be manufactured with the best cross-section to optimize the flow characteristics for a particular crop, and for a particular condition of the field and water.

In the embodiment of FIG. 4, the hose has a similar configuration to that of FIG. 1, and like elements have been designated by the same numbers. In the latter embodiment, however, the water regulating tube 4 is interrupted at spaced intervals by a cross rib 7 interconnecting the ribs 2 and 3 and margins 20 and 21, which could be formed for example by a convergence of the adhesive beads, or by the deposition of additional material at those positions. These interruptions divide the regulating tube 4 into a series of sealed separate co-linear sections, each having an inlet hole 5 and an outlet hole 6. In this embodiment, each section containing an inlet hole 5 and an outlet hole 6 is isolated from the adjacent sections, i.e., is individually connected to the supply tube 19, so that the inlet and outlet holes may be positioned at a maximum distance apart. The result approximates a parallel connection of each flow regulating tube section to supply tube 19 in that regardless of the length of the irrigation hose, within limits, approximately the same water pressure is present at each inlet port and water flows through each flow regulating tube section at approximately the same rate even though the hose is uniform throughout its length, i.e., there is no compensating change in cross sectional area of supply tube 19, flow regulating tube 4, inlet holes 5 or outlet holes 6, or the length of the flow regulating tube sections.

In the embodiment of FIG. 5, the longitudinal ribs designated 2A, 3A, and 3B are configured to form a plurality of stepped regulating tubes, two of which are designated 4A and 4B. The inlets and outlets designated 5A and 6A, respectively, are formed by discontinuities in the ribs themselves, rather than holes in the plastic material. Specifically, a plurality of longitudinally spaced transverse cross ribs 7A interconnect the longitudinal ribs 2A and 3A and the margins 20 and 21, while a plurality of longitudinally spaced transverse cross ribs 7B interconnect the longitudinal ribs 3A and 3B and the margins 20 and 21. The cross ribs 7A and 7B are slightly out of alignment with each other as illustrated in FIG. 5. The longitudinal rib 2A has a plurality of longitudinally spaced discontinuities adjacent to the respective cross ribs 7A, which serve as the inlets 5A. The longitudinal rib 3A has a plurality of longitudinally spaced discontinuities between the respective cross ribs 7A and 7B. The longitudinal rib 3B has a plurality of longitudinally spaced discontinuities adjacent to the respective cross ribs 7B, which serve as the outlets 6A.

In the embodiment of FIG. 6, the longitudinal ribs designated 2C, 3C and 3D are formed with the illustrated configuration, so that the ribs themselves form the inlets and outlets 5B and 6B, respectively and so that the longitudinal ribs form a series of isolated water regulating tubes 4C in which the water reverses direction, effectively increasing the length of each of the regulating tubes 4C between the inlets 5B and outlets 6B. Specifically, a plurality of longitudinally spaced transverse cross ribs 7C interconnect the longitudinally ribs 2C, 3C and 3D and the margins 20 and 21. The longitudinal ribs 2C and 3D each have a plurality of longitudinally spaced discontinuities adjacent to one side of the respective cross ribs 7C that form, respectively, the inlets 5B and outlets 6B, and the longitudinal rib 3C has a plurality of longitudinally spaced discontinuities adjacent to the other side of the respective cross ribs 7C.

FIG. 7, is a cross-section of another embodiment in which the hose is formed of two flexible bent sheets 1A and 1B with two overlapping longitudinal seams. One of the seams is sealed by two adhesive beads 2E and 3E, which form between them a first flow regulating tube 4D; and the second seam is sealed by two adhesive beads 2F and 3F, which form between them a second flow regulating tube 4E. Inlet and outlet holes, such as the holes 5 and 6 in FIG. 1, are provided along each seam.

In the embodiment of FIG. 8, the hose has an overlapping seam sealed by two adhesive beads 2G and 3G. The beads form a flow regulating tube 4F. In the embodiment of FIG. 8, the wall of the tube 1C adjacent to the flow regulating tube 4F is bulged to permit a greater water flow therethrough. Again, appropriate inlet and outlet holes, such as the holes 5 and 6 of the embodiment of FIG. 1 are provided along the flow regulating tube 4F.

In the embodiment of FIG. 9, the flexible sheet 1D is bent so the same side of the sheet faces itself to form an abutting seam which is sealed by two spaced and parallel beads 2H and 3H. The beads define a flow regulating tube 4G between them. Openings are provided in the beads themselves to constitute the inlets and outlets for the regulating tube. The configuration of FIG. 9 also permits construction of relatively large regulating tubes, as compared with the embodiments of FIGS. 1 through 7.

In the embodiment of FIGS. 10 through 12, the interior and exterior margins 20 and 21 of the regulating tube 4 are sealed at spaced intervals along the length of the sheet by a series of seals 10 to provide a plurality of separate regulating tube sections 4H extending longitudinally along the hose contiguous to the supply tube. A number of elongated slotted inlet openings 5A are provided in the interior margin 20, which serve as a filter to water passing into each flow regulating tube. Inlet openings 5A are individually smaller in area than the cross section of the flow regulating tube so particles that would clog the latter cannot pass through the former and are collectively larger in area than the cross section of the flow regulating tube so as not to restrict flow. Two parallel slits are formed in the exterior margin 21 to form an outlet opening 6A for each regulating tube section 4H. The two parallel slits form between them a flexible flap that serves as an outlet valve; specifically, when the irrigation hose is pressurized, the outward pressure exerted on the exterior margin 21, due to the flexibility of sheet 1, expands the flap outwardly to open the outlet valve and permit water to exit the irrigation hose. When the irrigation hose is depressurized, the flap contracts to close the outlet valve. In depressurization, water in hose supply passage migrates to the low point of the hose. Such migration may cause water in regulating tubes 4 to siphon back into the supply passage, thus providing self cleaning of the regulating tube inlet ports. Such siphoning is possible because the outlet valves do not close perfectly airtight. The outlet valve opening 6A in essence opens to let the water out, but closes sufficiently to seal out large particles of dirt and insects when the water is turned off. (The irrigation hose is often buried in use.) The outlet valve openings are not affected by build-up of salts in the water as is the tendency with outlet holes because the adjacent edges of the slits move together when the irrigation hose is depressurized, which tends to wipe off salt accumulation.

The filter at the entrance of each regulating tube 4H protects the flow regulating tubes from clogging. The filters are self-cleaning as the water is turned on and off; specifically due to reverse water flow from the regulating tube to the supply tube when the water is turned off, the filters are back flushed.

Uniformity of water flow is achieved because the flow regulating tubes are essentially fed in parallel by the full static water pressure of the supply tube, and not through a long low pressure secondary regulator tube. This reduces the requirement to level or contour fields being watered by the hose, or for the precise placement of the hose in the field. This construction also provides true drip flow without squirting.

Typical specifications for the hose of FIGS. 10 through 12 are as follows:
  Flow rate—222 liters/hour/100 meters at 0.56 Kg/cm
  Outlet opening spacing—20 cm
  Working pressure—0.14–0.56 Kg/cm
  Hose thickness—0.20 mm
  Hose diameter—1.6 cm
  Height of ribs—0.228 mm The length of the flow regulating tube sections and the spacing between inlet openings are the same as the spacing between outlet openings.

The invention provides, therefore, an improved irrigation hose which may be manufactured simply and inexpensively, and which is reliable in operation, and has no tendency to clog.

Although the hose is stated as being formed of a flat sheet of plastic material, it could be formed of treated paper, non-woven fabric, or other appropriate water impervious flexible sheet material with sufficient strength to withstand the water pressure.

In summary, the flow regulating function is controlled according to the invention by the length and cross sectional area of the flow regulating tube or tube sections, rather than by the orifice areas of the inlet and outlet openings. Orifice area flow rate control is nonlinear with pressure, whereas pressure control resulting from surface friction due to the length of the flow regulating tube is approximately linear. The height of and the distance between the transverse ribs determines the cross sectional area of the flow regulating tubes, and such area over a specific length regulates flow at a given inlet pressure. Since surface friction influences the flow rate, the cross sectional shape also plays a role.

Accordingly, although particular embodiments of the invention have been shown and described, modifications may be made. It is intended in the claims to cover all modifications which come within the true spirit and scope of the invention.

What is claimed is:

1. A flexible water dispensing tube for conducting water from a source and for discharging conducted water from the tube at selected intervals along the tube, the tube being formed principally from an elongate strip of thin flexible water impervious material, the strip having opposite margins along each elongate edge thereof, the tube being formed from the strip by disposition of the strip margins in juxtaposed relation to each other with a marginal face of the strip along one edge in opposed relation to a marginal face of the strip along the other edge and by interconnection of the juxtaposed margins by at least a pair of applied spaced ribs to define a lapped seam extending along the length of the tube and to define a primary water supply passage extending continuously within the tube, the ribs extending substantially parallel to the elongate extent of the seam and having a discrete thickness in a direction normal to the opposing faces of the strip margins whereby the opposing faces of the strip margins in the seam between the ribs are spaced from each other to define secondary water distribution passage means in the seam and whereby the ribs form a substantial portion of the boundaries of the distribution passage means, a plurality of inlet ports communicating between the supply passage and the distribution passage means at spaced locations along the tube, and water discharge outlets communicating from the distribution passage means to the exterior of the tube at spaced locations along the tube, and wherein the cross-sectional area and the effective linear extent of the distribution passage means between the inlet ports and the outlets are cooperatively configured and arranged to regulate the mass flow rate of water through the distribution passage means.

2. A method for manufacturing a flexible water dispensing tube for conducting water from a source and for discharging conducted water from the tube at selected intervals along the tube, the tube being formed principally from an elongate strip of thin flexible water impervious material having opposite margins along each elongate edge thereof, the method comprising the steps of:
disposing the margins of the strip in juxtaposed relation to each other with a marginal face of the strip along one edge in opposed relation to a marginal face of the strip along the other edge;
interconnecting the juxtaposed margins of the strip by applying at least a pair of spaced rib like adhesive beads to such margins to define a lapped seam extending along the length of the tube and to define a primary water supply passage extending continuously within the tube, the rib like beads extending substantially parallel to the elongate extent of the seam and having a discrete thickness in the direction normal to the opposing faces of the strip margins, whereby the opposing faces of the strip margins in the seam between the beads are spaced from each other to define secondary water distribution passage means in the seam and whereby the beads form a substantial portion of the boundaries of the passage means;
forming a plurality of inlet ports communicating between the supply passage and the distribution passage means at spaced locations along the tube; and
forming water discharge outlets communicating from the distribution passage means to the exterior of the tube at spaced locations along the tube, wherein the cross-sectional area and the effective linear extent of the distribution passage means between the inlet ports and the outlet ports are cooperatively configured and arranged to regulate the mass flow rate of water through the distribution passage means.

3. An irrigation hose comprising:
an elongated flat sheet of flexible water impervious material bent along its length to form a lapped longitudinal seam between opposing longitudinal margins of the sheet;
first and second longitudinally extending transverse ribs in spaced apart relationship interconnecting the opposing margins along their length to seal the overlapping longitudinal seam, thereby forming a flow regulating tube defined by the ribs and the opposing margins and a supply tube defined at least in part by the remainder of the sheet;
a plurality of longitudinally spaced inlets to the flow regulating tube; and
a plurality of longitudinally spaced outlets from the flow regulating tube displaced from the respective inlets to provide a substantial path length from each inlet to a respective outlet.

4. The hose of claim 3, in which opposite surfaces of the sheet face each other to form an overlapping longitudinal seam with opposing interior and exterior longitudinal margins, part of the supply tube being defined by the interior margin.

5. The hose of claim 4, in which the inlets each comprise one or more openings formed in the interior margin of the sheet.

6. The hose of claim 4, in which the outlets each comprise one or more openings formed in the exterior margin of the sheet.

7. The hose of claim 4, in which each outlet comprises a pair of adjacent slits formed in the exterior margin of the sheet and defining therebetween a flexible flap.

8. The hose of claim 7, in which each inlet comprises a plurality of openings formed in the interior margin of the sheet in longitudinally spaced relationship from the respective slits.

9. The hose of claim 8, additionally comprising means for sealing the opposing margins between the longitudinal ribs at spaced intervals along the length of the sheet between adjacent inlets and outlets to form a plurality of separate water flow regulating tube sections contiguous to the supply tube, one of the inlets being formed near one end of each tube section and one of the outlets being formed near the other end of each tube section.

10. The hose of claim 9, in which the sealing means comprises a transverse cross rib interconnecting the two longitudinal ribs and the interior and exterior margins.

11. The hose of claim 4, additionally comprising:
a third longitudinally extending transverse rib interconnecting the opposing margins along their length, the third longitudinal rib being disposed between the second longitudinal rib and the edge of the exterior margin in spaced relationship from the second longitudinal rib;
a first plurality of longitudinally spaced first transverse cross ribs interconnecting the first and second longitudinal ribs and the opposing margins;
a plurality of longitudinally spaced second transverse cross ribs interconnecting the second and third longitudinal ribs and the opposing margins, the second cross ribs being slightly out of alignment with the first cross ribs;
a plurality of longitudinally spaced discontinuities in the first longitudinal rib adjacent to the respective first cross ribs;
a plurality of longitudinally spaced discontinuities in the second longitudinal rib between the respective second and third cross ribs; and
a plurality of longitudinally spaced discontinuities in the third longitudinal rib adjacent to the respective third cross ribs, whereby the first, second, and third longitudinal ribs form with the first and second cross ribs separate water regulating tube sections configured to follow a stepped path, the discontinuities in the first longitudinal rib forming the inlets and the discontinuities in the third longitudinal rib forming the outlets thereof.

12. The hose of claim 4, additionally comprising:
a third longitudinally extending transverse rib interconnecting the opposing margins along their length, the third longitudinal rib being disposed between the second longitudinal rib and the edge of the exterior margin in spaced relationship from the second longitudinal rib;
a plurality of longitudinally spaced transverse cross ribs interconnecting the first, second and third longitudinal ribs and the opposing margins;
a plurality of longitudinally spaced discontinuities in the first and third longitudinal ribs adjacent to one side of the respective cross ribs forming, respectively, the inlets and the outlets of the flow regulating tube; and
a plurality of longitudinally spaced discontinuities in the second longitudinal rib adjacent to the other side of the respective cross ribs, whereby the first, second, and third longitudinal ribs form with the cross ribs separate flow regulating tube sections configured to follow a reversing path.

13. The hose of claim 3, additionally comprising means for sealing the opposing margins between the longitudinal ribs at spaced intervals along the length of the sheet between adjacent inlets and outlets to form a plurality of separate water flow regulating tube sections contiguous to the supply tube, one of the inlets being formed near one end of each tube section and one of the outlets being formed near the other end of each tube section.

14. The hose of claim 13, in which the sealing means comprises a transverse cross rib interconnecting the two longitudinal ribs and the opposing margins.

15. The hose of claim 3, in which the same surface of the sheet faces itself to form an abutting longitudinal seam with opposing longitudinal margins, the supply tube being defined completely by the remainder of the sheet.

16. The hose of claim 3, in which the outlets are equal in number to the inlets.

17. An irrigation hose comprising:
first and second elongated flat sheets of flexible water impervious material bent along their length to form a first overlapping longitudinal seam between opposing interior and exterior longitudinal margins of the first and second sheets, respectively, and a second overlapping longitudinal seam between opposing exterior and interior longitudinal margins of the first and second sheets, respectively;
a first pair of longitudinally extending transverse ribs in spaced apart relationship interconnecting the interior and exterior margins of the first and second sheets respectively, along their length to seal the first overlapping longitudinal seam, thereby forming a first flow regulating tube defined by the first pair of ribs and the interior and exterior margins of the first and second sheets, respectively;
a second pair of longitudinally extending transverse ribs in spaced apart relationship interconnecting the exterior and interior margins of the first and second sheets, respectively, to seal the second overlapping longitudinal seam, thereby forming a second flow regulating tube defined by the second pair of ribs and the exterior and interior margins of the first and second sheets, respectively, a supply tube being defined by the remainder of the sheets and the interior margins;
a plurality of longitudinally spaced inlets to each of the first and second flow regulating tubes; and
a plurality of longitudinally spaced outlets from each of the first and second flow regulating tubes.

18. The method for constructing an irrigation hose comprising the steps of:
bending an elongated flat sheet of flexible water impervious material along its length to form a longitudinal seam between opposing longitudinal margins of the sheet,
sealing the longitudinal seam with two rib like adhesive beads extending longitudinally along the opposing margins of the sheet in spaced apart relationship to form a flow regulating tube defined by the beads and the opposing margins and to form a supply tube defined at least in part by the remainder of the sheet;
forming a plurality of inlets to the flow regulating tube; and
forming a plurality of outlets from the water flow regulating tube displaced from the respective inlets to provide a substantial path length from each inlet to a respective outlet.

19. The method of claim 18, in which the bending step bends the sheet such that opposite sides of the sheet face each other so the longitudinal seam is an overlapping seam between opposing interior and exterior longitudinal margins of the sheet.

20. The method of claim 19, in which the step of forming each outlet comprises forming a pair of adjacent slits in the exterior margin.

21. The method of claim 20, in which the step of forming each inlet comprises forming a plurality of longitudinally spaced openings in the interior margin.

22. The method of claim 18, in which the bending step bends the sheet such that the same side thereof faces itself so the longitudinal seam is an abutting seam.

23. The method of claim 18, comprising the additional step of sealing the opposing margins between the beads at spaced intervals along the length of the sheet to form a plurality of separate flow regulating tube sections contiguous to the supply tube and separately connected thereto.

24. The method of claim 18, in which the sealing step seals the longitudinal seam with hot melt adhesive beads.

* * * * *